Sept. 30, 1947.  J. M. KEMPER  2,428,283
CABIN PRESSURE CONTROL
Filed Dec. 13, 1943
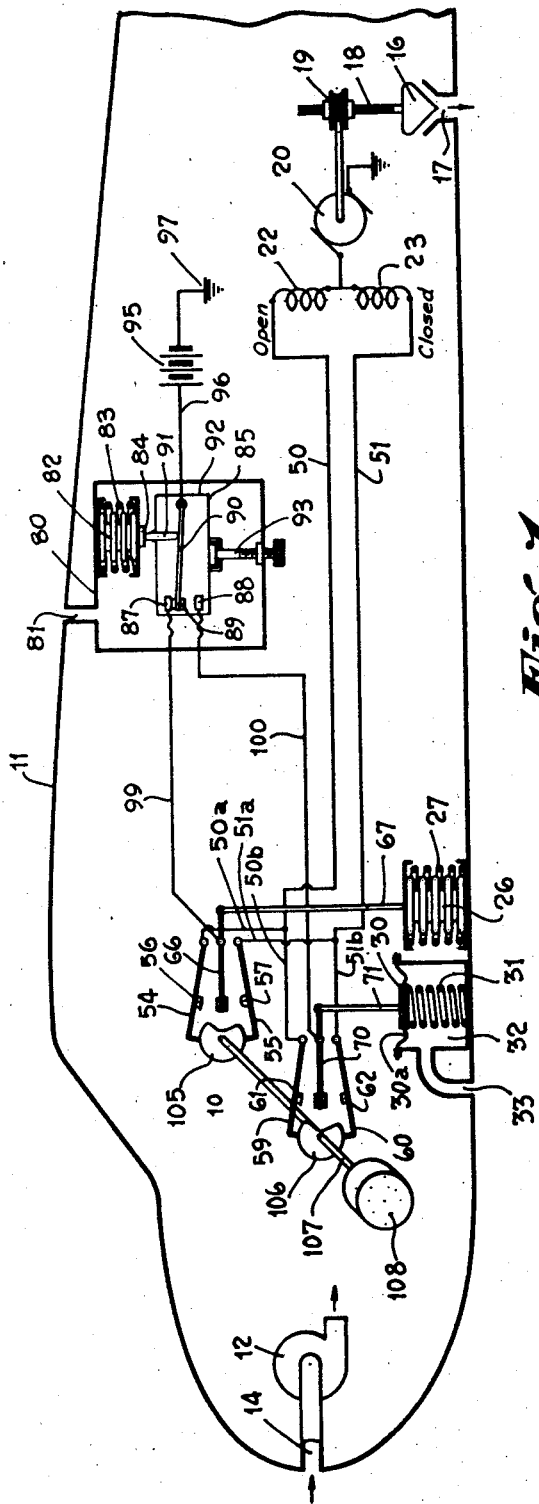
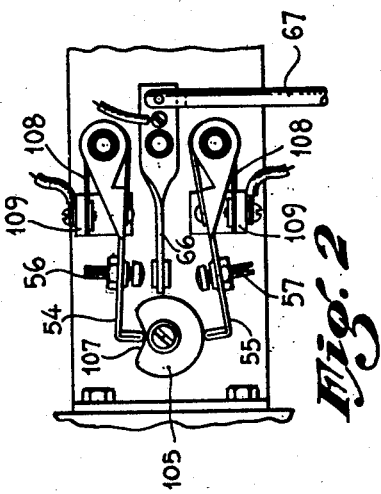
Inventor:
JAMES M. KEMPER,
By
Attorney.

Patented Sept. 30, 1947

2,428,283

UNITED STATES PATENT OFFICE 2,428,283

CABIN PRESSURE CONTROL

James M. Kemper, Hollywood, Calif., assignor to The Garrett Corporation, Airesearch Manufacturing Company division, Los Angeles, Calif.

Application December 13, 1943, Serial No. 514,055

11 Claims. (Cl. 98—1.5)

My invention relates to pressurizing apparatus whereby pressure within an enclosed space or cabin of an aircraft may be maintained within predetermined limits.

A system of the general type to which my invention relates is disclosed in the reissue patent to Price No. Re. 22,272, issued February 16, 1943.

It is an object of my invention to provide a pressure control means for maintaining the cabin pressure at a predetermined pressure irrespective of outside or ambient air pressure and a pressure control means for maintaining the cabin pressure at a predetermined pressure with relation to ambient air pressure, that is, at a predetermined differential, and in which there is a means for causing either one or the other of said pressure control means to control the pressure in the cabin.

It is a further object of my invention to provide a cabin pressurizing system in which the control of cabin pressure is automatically switched from one pressure control means to another pressure control means at a predetermined altitude. As an example of the utility of my invention, the cabin of the airplane may have ambient pressure within it until a predetermined altitude has been reached, say, for example, 10,000 feet above sea level. When that altitude has been reached one of the pressure control means comes into operation. Preferably, this control means is an absolute or constant pressure control means which maintains the pressure in the cabin at a predetermined value. This pressure control means will control the cabin pressure until the airplane reaches another predetermined elevation, for example, 30,000 feet. At this time the other pressure control means, which is preferably a differential pressure control means, comes into operation, and this second mentioned control means maintains the pressure within the cabin at a predetermined differential with respect to the pressure outside the cabin, preferably at around six pounds. When the airplane flies at elevations of 30,000 feet or higher the differential pressure control means prevents the pressure differential from ever exceeding approximately six pounds per square inch, which is well within the factor of safety of the airplane structure.

It is an object of my invention to provide a system for controlling the pressure in an aircraft cabin which has two separate electrical control means for separately controlling the mechanism of the aircraft which determines what pressure exists in the cabin and to provide in conjunction therewith a selector means which automatically functions to connect either one or the other of the electrical control circuits so that the desired pressures will be maintained in the cabin.

It is a still further object of my invention to provide a system of the character pointed out in which the control of desired pressure may be accomplished with greater accuracy and in which the hunting of the controls will be eliminated. This object of my invention I accomplish by providing for periodic energizations of the mechanism which controls the pressure within the cabin, these periodic periods of energizations being separated by periods of rest. In this way the pressure within the cabin is able to adjust itself to a new position or actuation of the mechanism, and in this way fluctuations above and below the desired pressure within the cabin will be reduced to a minimum.

In the preferred form of my invention the intermittent periods of energization or deenergization or periods of rest are accomplished by a rotating cam mechanism which alternately closes and opens the control circuit then in use. This portion of my invention which relates to the elimination of or greater reduction in hunting may be used in other systems as well as the one disclosed herein.

Other objects and advantages of my invention will be brought out in the course of the following detailed description of my invention.

Referring to the accompanying sheet of drawing,

Fig. 1 is a diagrammatic view illustrating my invention. The various parts employed are well known in the art and have only been diagrammatically illustrated.

Fig. 2 is a fragmentary view showing the make and break mechanism which periodically energizes the mechanism which controls the pressure in the cabin.

Referring to the drawing in detail, and particularly Fig. 1, the numeral 11 is representative of an aircraft cabin. The cabin is provided with an air circulating system which causes air to circulate through the cabin for convenient respiration and comfort of the passengers. This air circulating system may be any one of a number of well known mechanisms, and I have therefore illustrated a blower 12 which draws ambient air through the duct 14 and delivers the air under pressure to the interior of the cabin. In the form of my invention illustrated I have shown the blower 12 as being a constant pressure blower. However, variable pressure blowers or other pressure producing means may be provided. For the purpose of determining pressure which exists in the cabin 11, I provide an exhaust valve 16 which controls the exhaust air through an air outlet 17. This valve 16 is connected to a lead screw 18 and is advanced upward or downward by a gear arrangement 19, which gear arrangement is operated to open or close the valve by means of a reversible motor 20 having windings 22 and 23 separately energizable and being employed to rotate the rotor of the motor in reverse directions to open or close the valve 16. The valve 16 and associated mechanism are representative of a means for controlling the exhaust of air from the cabin and are consequently representative of a means for controlling the pressure within the cabin.

When the aircraft is flying below a predetermined level, for example, 10,000 feet, as previously pointed out, the valve 16 is in fully opened position and the pressure within the cabin may be equal to ambient air pressure. Therefore, the pressure within the cabin may vary from sea level pressure of 14.70 pounds per square inch to 10.11 pound per square inch. When the airplane is flying above 10,000 feet and below another predetermined elevation, such, for example, as 30,000 feet, as pointed out heretofore, the valve 16 is so operated as to maintain the pressure within the cabin at substantially 10.11 pounds per square inch notwithstanding the fact that the ambient pressure may drop as low as 4.36 pounds per square inch at the 30,000 foot level.

This control is effected as follows. In the cabin 11 is placed an aneroid 26 which is responsive to the pressure within the cabin. The aneroid 26 is provided with a balance spring 27, and as the pressure in the cabin tends to decrease the aneroid tends to expand, or as the cabin pressure tends to increase the aneroid tends to collapse. The aneroid is a part of a constant or absolute pressure control and is illustrative of one of a number of types of controls which may be employed. This constant pressure control aneroid 26 is adapted to close circuits which energize either the winding 22 or the winding 23, thus opening or closing the valve 16.

Also positioned in the cabin is a differential pressure responsive means which forms a part of the differential pressure control means. This differential pressure control means comes into operation by actuation of the selector means, which will be described shortly, whenever the aircraft reaches an elevation of 30,000 feet. The differential pressure responsive means prevents the air pressure within the cabin from exceeding approximately 6 pounds per square inch more than the ambient pressure. If the two elevations, of 10,000 and 30,000 feet are selected, then the differential pressure control means which takes over control when the 30,000 foot elevation is reached will prevent a differential of greater than 5.75 pounds per square inch, which is the pressure differential between the cabin and ambient air at 30,000 feet. As the airplane flies to a higher elevation than 30,000 feet, pressure within the cabin will decrease with the ambient air pressure so that the differential does not exceed the predetermined set limit. The differential pressure responsive means 30 includes a diaphragm 30a supported by a balance spring 31. The upper face of the diaphragm is subjected to cabin pressure, while the lower face is subjected to ambient air pressure communicated to the chamber 32 through a connection 33. This differential pressure responsive device controls an electric circuit which energizes either the winding 22 or the winding 23 which opens or closes the valve 16, as desired.

I will now describe the electric circuits and the selector means which constitute the remaining parts of the combinations of my invention. An electric conductor 50 is connected to the winding 22, and an electric conductor 51 is connected to the winding 23. Each of the conductors 50 and 51 is divided into parallel circuits formed by conductors 50a and 50b and also 51a and 51b. The conductors 50a and 51a are extended adjacent each other and are connected to switch members 54 and 55, respectively, which carry contacts 56 and 57. The conductors 50b and 51b extend adjacent each other and are connected to switch 59 and 60, respectively, which carry contacts 61 and 62. Cooperating with the switch members 54 and 55 is a switch member 66 which is operatively connected to the constant pressure responsive means 26 by a rod 67 which causes the switch member 66 to occupy a non-contacting position or positions to be contacted by either the contact 56 or the contact 57, depending upon the position of the aneroid 26. Cooperating with the switch members 59 and 60 is a switch member 70 which is connected to the differential pressure responsive means 30 by a rod 71 so that the switch member 70 assumes a non-contacting position or positions to engage either the contact 61 or the contact 62, depending upon the position of the diaphragm 30a.

My invention provides means for connecting either one of the control circuits to energize the motor 20. As typical of such a selector means, I illustrate an enclosed chamber 80 communicated to the outside of the cabin 11 by a conduit 81 so that ambient air pressure exists in the chamber 80. An aneroid 82 having a balance spring 83 is positioned in the chamber 80 and expands and contracts with a decrease and increase of pressure in the chamber 80. Depending from the aneroid 82 is a short operating stem 84 which is adapted to open and close a selector switch 85 positioned therebelow. The selector switch 85 includes stationary contacts 87 and 88 and a movable contact 89 supported on a pivoted arm 90 and connected to an upwardly extending stem 91. The contact 90 may be in the form of a leaf spring and is positioned normally to cause the contact 89 to engage the contact 87. The selector means is supported in a housing 92 which may be raised or lowered by an adjustment screw 93 so that the stem 84 will engage the stem 91 at different amounts of expansion of the aneroid 82, thus causing the contact 89 to disengage the contact 87 at a lower or higher air pressure within the chamber 80, as desired. In the operation of this device, the contact 87 is always engaged by the contact 89 until the airplane reaches an elevation at which there will be sufficient reduction in air pressure in the chamber 80 to cause the aneroid 82 to expand sufficiently to cause the stem 84 to engage and push the stem 91 downwardly, thus disengaging the contact 87 and engaging the contact 89 with the contact 88. It will be seen that by raising the selector means upward or downward relative to the aneroid 82 the air pressure at which the contact 89 is moved may be varied. In the form of my invention illustrated herein the parts are adjusted so that the contact 89 disengages the contact 87 and engages the contact 88 at an elevation of approximately 30,000 feet.

The arm 90 is connected to a battery 95 by a conductor 96. The opposite side of the battery may be grounded, as indicated at 97. The contact 87 is connected by a conductor 99 with the switch member 66, and the contact 88 is connected by a conductor 100 with the switch member 70.

Associated with the pairs of switch members 54 and 55 and 59 and 60 is a make and break mechanism for causing intermittent or periodic energization of the winding 22 or the winding 23. However, before describing this mechanism which is illustrated in Fig. 2, the general operation of the system will be described and thereafter the manner in which periodic energization is accomplished will be explained.

As previously pointed out, the various elements which comprise my invention are well known in the industry. The aneroids 26 and 82, the pressure differential responsive means 30 including the diaphragm 30a, the dump valve 16 and motor 20, the blower 12, and various other parts are well known in the art, and my invention consists in the new combination of these elements as explained herein and as defined by the appended claims. In describing the operation of my invention, I will describe a typical example. It should be understood, however, that the elevations selected as points of change-over from one control to the other may be varied, as desired.

With this in mind, in the form of my invention disclosed herein the valve 16 remains open until an elevation of 10,000 feet is reached. When the elevation exceeds that amount the aneroid 26, by reason of reduction in pressure, will expand, thus moving the switch member 66 in a counterclockwise direction causing it to engage the contact 57. This closes the circuit which includes the ground 97, the battery 95, the conductor 96, the arm 90, the contacts 89 and 87, the conductor 99, the switch member 66, the contact 57, the switch member 55, the conductor 51a, the conductor 51, the winding 23, and the motor 20. This energizes the motor 20 so as to advance the exhaust valve downward, thus decreasing the effective size of the opening 17 and thus causing pressure to be built up in the cabin 11. When this pressure in the cabin 11 builds up to the desired pressure, which in this instance would be 10.11 pounds per square inch, the aneroid 26 is partially collapsed or assumes normal position so as to disengage the switch member 66 from the contact 57, thus opening the electric circuit. If the pressure within the cabin builds up above the desired pressure, then the aneroid 26 is collapsed further, which moves the switch member 66 in a clockwise direction and causes it to engage the contact 56. This then completes the electric circuit which includes the conductor 50a and 50 and the winding 22 of the motor. This causes the motor to operate in a reverse direction and will cause the valve 16 to be advanced upward, thus increasing the effective size of the opening 17. When the pressure decreases to the desired pressure the aneroid partially expands and returns the switch member 66 to normal.

As the aircraft gains altitude and, let us say, approaches a 30,000 foot elevation, the mechanism which has been described operates to maintain the pressure within the cabin at a uniform pressure, while the pressure of the ambient air has decreased from 10.11 pounds per square inch to 4.36 pounds per square inch at 30,000 feet. When the 30,000 foot elevation has been reached the aneroid 82 of the selector means will have expanded to the extent that the stem 84 engages and depresses the stem 91, thus moving the contact 89 from engagement with the contact 87 to engagement with the contact 88. This is effective in disconnecting the constant pressure control means 26 and connecting the differential pressure control means 30. It will be seen that this selector means is operated entirely independent of the operation of either the constant or differential pressure control means and functions at a definite elevation to cause either one or the other of the control means to be operatively connected so that it is capable of controlling pressure within the cabin.

At this point in the operation of the device the differential control means is rendered effective to operate the motor 20 as required to maintain the pressure within the cabin at a predetermined differential with respect to ambient air pressure. It will be seen that the diaphragm 30a will assume a position depending upon the pressure differential within and outside the cabin. When this pressure differential is 5.75 in the example herein given the switch member 70 will occupy a central position. If the pressure within the cabin builds up too high so that there is a greater pressure differential, then the diaphragm 30a will be forced downward and the switch member 70 will move in a clockwise direction, thus causing it to engage the contact 61. At this time the circuit will be closed which includes ground 97, battery 95, conductor 96, the arm 90, the contacts 89 and 88, the conductor 100, the switch member 70, the contact 61, the switch member 59, the conductor 50b, the conductor 50, the winding 22, and the motor 20. This will energize the motor to open the exhaust valve 16 and thus allow the pressure within the cabin to decrease. When the proper pressure differential has been reached, the diaphragm 30a will move up, thus returning the switch member 70 to its inoperative position. On the other hand, if the pressure within the cabin decreases below the proper pressure differential, it will be necessary to build up the pressure and the device will function as follows. A reduction in pressure in the cabin permits the diaphragm to be moved upward. This moves the switch 70 in a counterclockwise direction, thus causing it to engage the contact 62. This then includes in the electric circuit the contact 62, the switch member 60, the conductors 51b and 51, the winding 23, and the motor 20. This energization of the winding of the motor will cause the valve 16 to close. This restricts the outflow of air and thus causes the air pressure in the cabin to increase. When the air pressure has increased, as desired, the diaphragm 30a is returned to its normal position and the switch member 70 returns to an inoperative position.

As previously pointed out, it is an object of my invention to prevent hunting. Hunting in a device of this character occurs because there is a time delay between the change in position of the valve 16 and the pressure in the cabin adjusting itself to the new valve position. In other words, the pressure limit desired is exceeded and there must then be a reverse operation to bring the pressure back to the desired pressure. Very often the pressure will fluctuate many times above and below a desired pressure due to time delay between the actuation of the exhaust valve and the change in pressure created in the cabin as a result of a change in position of the valve. In my invention I provide a control means which produces relatively short periods of operation alternated with periods of rest, thereby allowing time for the pressure in the cabin to respond to the change in the position of the exhaust valve. This object is accomplished by the mechanism illustrated in Fig. 1 and a part of which is shown in detail in Fig. 2.

Referring to Fig. 1, there is positioned between the switch members 54 and 55 a rotatable cam 105, and there is positioned between the switch members 59 and 60 a rotatable cam 106. These two cams are mounted on a shaft 107 which is rotated at a predetermined rate by a small motor 108. In Fig. 2, I have illustrated a make and break mechanism which is representative of each of the make and break mechanisms in the separate circuits shown in Fig. 1. I will describe the mechanism as though it were in the circuit included in the constant pressure control means, but it should be understood that the description of the construction and operation applies with equal force to the make and break mechanism in the differential pressure control means. Referring to Fig. 2, the cam 105 has a notch or depression 107 in its periphery. The ends of the switch members 54 and 55 engage the peripheral face of the cam and are urged toward the axis of the cam by springs 108 which extend to terminal plates 109 to which the conductors 50a and 51a are connected. The contacts 56 and 57 are adjustably supported by the switch members 54 and 55 so that the switch member 66 will not be engaged when it is in a neutral position.

During the operation of the system of my invention the motor 108 is energized to constantly rotate the cams 105 and 106 and the switch members 54, 55, 59, and 60 are caused to, for a very short period, swing downwardly into such a position that the contact carried by each one of switch members is capable of being engaged by the switch member 66 or the switch member 70 when either one of the switch members is in an actuated position. It will be seen, however, that the switch member is in a depressed position for a relatively short period of time and is in a raised or inoperative position for a major part of the revolution of the cam member with which it is associated. Therefore, even though the switch member 66 or the switch member 70 may be in an actuated position over a period of time, the circuit associated therewith will not be closed for that entire period of time because it is only at definite periods that the switch members 54, 55, 59, or 60 are in a depressed position capable of engagement with the switch member 66 or the switch member 70.

With the device just described in operation in the circuit, the operation will be as follows. If the airplane is at an elevation of between 10,000 and 30,000 feet, the constant pressure control means will be operatively connected to the motor 20. If the pressure in the cabin increases above 10.11 pounds per square inch, the aneroid 26 will be collapsed and the switch member will be swung in a clockwise direction. This moves the left end of the switch member upward in a position to be contacted by the contact 56 when the switch member 66 enters the depression 107. It will be seen that this will cause periodic or intermittent engagements between the switch member 66 and the contact 57 which will in turn cause intermittent or periodic energizations of the motor 20. In the example just given the motor will be energized for a short duration and the valve 16 will be moved upward a slight amount. If, before the cam completes its revolution, air pressure in the cabin has been reduced sufficiently to compress the aneroid 26 to normal, the switch member 66 will return to normal position and there will be no further opening of the valve. However, if air pressure has not quite dropped to normal, there will be a successive energization of the motor 20 and a successive opening operation of the valve 16. The successive energization will occur until the pressure in the cabin is caused to be brought back to the desired pressure. In this way there will be no prolonged energization of the motor 20 which will cause the exhaust valve 16 to be moved too great a distance and thus cause the hunting which is so undesirable.

Although I have illustrated but one form of my invention, it should be understood that various modifications and alterations may be made without departing from the spirit and scope of my invention. I believe my invention to be broadly new in the provision of two separate pressure control means and a separate selector means whereby either one or the other of the pressure control means may be caused to operate the mechanism which determines the cabin pressure. I also believe my invention to be broadly new in the incorporation of means for periodically energizing the control mechanism to thus eliminate hunting.

I claim as my invention:

1. In a system for controlling the pressure in an aircraft cabin, the combination of: regulating means for controlling the pressure in said cabin; constant pressure means responsive to cabin pressure operative to control said regulating means so as to maintain pressure in the cabin which is independent of ambient pressure; differential pressure means, responsive to the pressure differential between the cabin interior and ambient atmospheric pressure, operative to control said regulating means so as to maintain a predetermined pressure differential between cabin pressure and ambient pressure; and ambient pressure responsive means for selectively rendering effective the constant pressure means and the differential pressure means in their respective control of the regulating means.

2. In a system for controlling the pressure in an aircraft cabin, the combination of: air circulating means whereby air is circulated through the cabin; regulating means for controlling the flow of air through said cabin; constant pressure means responsive to cabin pressure operative to control said regulating means so as to maintain pressure in the cabin which is independent of ambient pressure; differential pressure means, responsive to the pressure differential between the cabin interior and ambient atmospheric pressure, operative to control said regulating means so as to maintain a predetermined pressure differential between cabin pressure and ambient pressure; and ambient pressure responsive means for selectively rendering effective the constant pressure means to control said regulating means below a predetermined ambient pressure and to connect said differential pressure means to control the regulator above said predetermined ambient pressure.

3. In a system for controlling the pressure in an aircraft cabin, the combination of: regulating means for regulating the exhaust of air from the cabin; constant pressure means responsive to cabin pressure operative to control said regulating means so as to maintain a substantially constant pressure in the cabin; differential pressure means, responsive to changes in the pressure differential between the cabin interior and ambient atmospheric pressure, operative to control said regulating means so as to maintain a pressure in the cabin at a predetermined differential to ambient pressure; and ambient pressure responsive means rendering operative said constant pressure means when the ambient pressure is below a predetermined level and for rendering operative the differential pressure means when the ambient pressure is above said predetermined level.

4. In a system for controlling the pressure in an aircraft cabin, the combination of: regulating means for controlling the exhaust of air from the cabin; constant pressure means, including an electric circuit which may be connected to said regulating means for operating same, to maintain a constant pressure in the cabin, said constant pressure means being responsive to cabin pressure; differential pressure means, including an electric circuit which may be connected to said regulating means, for operating the same, to maintain a pressure in the cabin at a predetermined differential to ambient pressure, said differential pressure means being responsive to the differential of pressure between that in the cabin and ambient atmospheric pressure; an ambient pressure sensitive means for selectively connecting the electric circuit of said constant pressure means when the ambient pressure is below a predetermined level and for connecting the electric circuit of said differential pressure means when the ambient pressure is above said predetermined ambient pressure level.

5. In a system for controlling the pressure in an aircraft cabin, the combination of: regulating means for controlling the exhaust of air from the cabin; constant pressure means, including an electric circuit which may be connected to said regulating means, for operating said regulating means to maintain a substantially constant pressure in the cabin, said constant pressure means being responsive to cabin pressure; differential pressure means including an electric circuit, which may be connected to said regulating means for operating the same to maintain a pressure in the cabin at a predetermined differential to ambient pressure, said differential pressure means being responsive to the differential of pressure between the cabin interior and ambient atmospheric pressure; selector means responsive to ambient pressure, for alternately connecting the electric circuit of said constant pressure means to said regulating means below a predetermined ambient pressure level and for connecting the electric circuit of said differential pressure means to said regulating means above a predetermined ambient pressure level; and automatic intermittent means for intermittently opening said electric circuits to produce periods of operation of said regulating means alternated with periods of rest to permit the pressure in the cabin to respond to a change in said regulating means.

6. In combination in a system for controlling pressure in an aircraft cabin in which the pressure in the cabin is maintained at a predetermined constant pressure or at a predetermined differential with ambient pressure, the combination including: mechanism having a valve and an electric motor operative to control the cabin pressure; an electric circuit operative to energize said motor so as to actuate the valve for increasing cabin pressure; a second electric circuit operative to energize said motor so as to actuate said valve for decreasing cabin pressure; means responsive to cabin pressure for closing one of said circuits; means responsive to the differential of pressure between that in the cabin and atmospheric pressure for closing the other of said circuits; ambient pressure responsive means to close said first mentioned circuit below a predetermined ambient pressure and to close said second circuit above a predetermined ambient pressure; and intermittent means for intermittently opening the electric circuit closed by the ambient pressure means to provide intermittent energization of said mechanism.

7. In a system for controlling pressure in an aircraft, the combination of: mechanism for controlling pressure within the cabin; two separate pressure responsive means for independently effecting operation of said mechanism to maintain a pressure in said cabin in a predetermined way, one of said means being responsive to cabin pressure and the other of said means being responsive to the differential of pressure between that in the cabin and the pressure outside of said cabin; and selector means responsive to ambient pressure interposed between said two pressure responsive means and said mechanism for connecting one of said pressure responsive means with said mechanism to effect operation of same when ambient pressure is below a predetermined value and for connecting the other of said pressure responsive means to said mechanism to effect operation of the same when ambient pressure is above a predetermined value, in order to control the pressure in the cabin as desired.

8. In a system for controlling pressure in an aircraft cabin, the combination of: mechanism for controlling pressure within the cabin, said mechanism having an exhaust valve which by being opened or closed determines the pressure in the cabin; two electric circuits, including an electric motor, connected to operate said exhaust valve, one of said circuits when closed being capable of opening said exhaust valve, the other of said circuits when closed being capable of closing said exhaust valve; absolute pressure responsive means sensitive to cabin pressure for opening and closing one of said electric circuits; differential pressure responsive means sensitive to differential in cabin pressure over ambient pressure for opening and closing the other of said electric circuits; and absolute pressure responsive means connected to the exterior of the cabin for rendering one of said electric circuits operative below a predetermined ambient pressure and for rendering the other of said circuits operative above a predetermined ambient pressure, to energize and control the operation of said exhaust valve.

9. In a system for controlling the pressure in an aircraft cabin, the combination of: air circulating means whereby air is circulated through the cabin; regulating means for controlling the exhaust of air from the cabin; constant pressure means responsive to cabin pressure operative to control said regulating means so as to regulate the flow of air through the cabin and maintain pressure therein which is independent of ambient pressure; differential pressure means, responsive to the pressure differential between the cabin interior and ambient atmospheric pressure operative to control said regulating means so as to regulate the flow of air through the cabin and maintain a predetermined pressure differential between cabin pressure and ambient pressure; and ambient pressure responsive means for selectively rendering effective the constant pressure means and the differential pressure means in accordance with predetermined ambient pressure conditions.

10. In a system for controlling the pressure in an aircraft cabin, the combination of: means for supplying air to the cabin under pressure; means for exhausting air from the cabin; regulating means for said exhaust means for regulating the exhausting of air from the cabin; means responsive to cabin pressure, operatively connected to the regulating means, for maintaining cabin pressure constant within a relatively low range of flight altitudes; means responsive to cabin pressure and atmospheric pressure, operatively connected to the regulating means, to maintain a constant differential of cabin pressure over atmospheric pressure within a higher range of flight altitudes; and means responsive to atmospheric pressure and operatively connected to the means responsive to cabin pressure and to the means responsive to cabin and atmospheric pressure for selectively connecting said responsive means to the regulating means at predetermined flight altitudes.

11. In a system for controlling the pressure in an aircraft cabin, the combination of: regulating means for controlling the exhaust of air from the cabin; constant pressure means, including an electric circuit, which may be connected to said regulating means, for operating said regulating means to maintain a substantially constant pressure in the cabin, said constant pressure means being responsive to cabin pressure; differential pressure means, including an electric circuit which may be connected to said regulating means for operating the same to maintain a pressure in the cabin at a predetermined differential to ambient pressure, said differential pressure means being responsive to the differential of pressure between that in the cabin and ambient atmospheric pressure; selector means responsive to ambient pressure, for alternately connecting the electric circuit of said constant pressure means to said regulating means below a predetermined ambient pressure level and for connecting the electric circuit of said differential pressure means to said regulating means above a predetermined ambient pressure level; and automatic intermittent means for intermittently opening said electric circuits to produce periods of operation of said regulating means alternated with periods of rest to permit the pressure in the cabin to respond to a change in said regulating means.

JAMES M. KEMPER.

REFERENCES CITED

The following references are of record in the file of this patent:

UNITED STATES PATENTS

| Number | Name | Date |
|---|---|---|
| 1,511,489 | Armstrong | Oct. 14, 1924 |
| 2,284,984 | Nixon et al. | June 2, 1942 |
| 2,208,554 | Price | July 16, 1940 |
| 1,562,663 | Strong | Nov. 24, 1925 |
| 1,947,223 | Ophuls | Feb. 13, 1934 |
| 2,346,437 | Krogh | Apr. 11, 1944 |